United States Patent [19]

Paszner et al.

[11] Patent Number: 4,470,851

[45] **Date of Patent: * Sep. 11, 1984**

[54] HIGH EFFICIENCY ORGANOSOLV SACCHARIFICATION PROCESS

[76] Inventors: Laszlo Paszner, 3906 W. 33rd Ave., Vancouver, Canada, V6N 2H8; Pei-Ching Chang, 7211 Frances St., Burnaby, Canada

[ * ] Notice: The portion of the term of this patent subsequent to Oct. 11, 2000 has been disclaimed.

[21] Appl. No.: 347,238

[22] Filed: Feb. 9, 1982

Related U.S. Application Data

[63] Continuation-in-part of Ser. No. 248,023, Mar. 26, 1981, Pat. No. 4,409,032, which is a continuation-in-part of Ser. No. 135,175, Mar. 28, 1980, abandoned, which is a continuation of Ser. No. 28,447, Apr. 9, 1979, abandoned, which is a continuation of Ser. No. 932,421, Aug. 11, 1978, abandoned.

[51] Int. Cl.[3] .................. D21C 3/20; C13K 1/02; C07G 1/00

[52] U.S. Cl. .................. 127/37; 162/14; 162/16; 162/76; 162/77; 162/72

[58] Field of Search .................. 162/76, 77, 80, 82, 162/81, 72, 16, 14; 127/37, 43

[56] References Cited

U.S. PATENT DOCUMENTS

| | | | |
|---|---|---|---|
| 1,856,567 | 5/1932 | Kleinert et al. | 162/14 |
| 1,919,623 | 7/1933 | Dreyfus | 162/72 |
| 2,022,654 | 12/1935 | Dreyfus | 162/77 |
| 2,024,689 | 12/1935 | Groombridge | 162/76 |
| 2,042,705 | 6/1936 | Dreyfus | 162/71 |
| 2,070,585 | 2/1937 | Dreyfus | 162/77 |
| 2,730,279 | 3/1955 | Bate et al. | 162/76 |
| 2,730,444 | 1/1956 | Hodge et al. | 162/76 |
| 2,783,146 | 2/1957 | McKee | 162/76 |
| 3,479,248 | 11/1969 | Nobile | 162/16 |
| 3,585,104 | 6/1971 | Kleinert | 162/77 |
| 3,764,462 | 10/1973 | Baierl | 162/16 |
| 4,100,016 | 7/1978 | Diebold et al. | 162/77 |

FOREIGN PATENT DOCUMENTS

| | | | |
|---|---|---|---|
| WO79/00119 | 3/1979 | PCT Int'l Appl. | 127/37 |
| 2003478 | 3/1979 | United Kingdom . | |

OTHER PUBLICATIONS

Chang et al., "Comparative Dissolution Rates of Carbohydrates & Lignin During Acidified Aqueous Organusolv Saccharification of Alcohol–Benzene Extracted Douglas Fir & Aspen Woods" presented at Tappi Forest Biology/Wood Chem. Symp., Jun 20–22, (1977), Madison Wis.

Chang et al., "Recovery and GC Analysis of Wood Sugars from Organosolv Saccharification of Douglas–Fir–Heartwood" presented at 1976 Canadian Wood Chemistry Symposium, Mont Gabriel P. Q., Sep. 1–3, 1976.

*Primary Examiner*—William Smith
*Attorney, Agent, or Firm*—Ian C. McLeod

[57] ABSTRACT

Comminuted cellulosic materials which may or may not contain lignin are partially or totally hydrolyzed or saccharified by an improved organosolv process using an aqueous acetone solvent mixture containing a small amount of an acidic compound and containing at least about 70 percent by volume of acetone and up to virtually anhydrous acetone. The process is performed at elevated reaction temperatures, preferably at 145° C. to 230° C., for a limited period of time and then with cooling such that the resultant dissolved sugars from the hydrolysis are not degraded into non-sugars. In particular the reaction is conducted such that the cellulosic material is dissolved and such that at least ninety percent or more of available sugars in the cellulosic material are recovered. Unexpectedly it has been found that acetone at high concentration forms stable complexes with the sugars which prevents their degradation and also facilitates separation of the sugars. Lignin and sugars derived are commercially useful chemical compounds.

18 Claims, No Drawings

HIGH EFFICIENCY ORGANOSOLV SACCHARIFICATION PROCESS

CROSS-REFERENCE TO RELATED APPLICATION

This application is a continuation-in-part of U.S. application Ser. No. 248,023, filed Mar. 26, 1981, U.S. Pat. No. 4,409,032 which is a continuation-in-part of Ser. No. 135,175, filed Mar. 28, 1980, abandoned, which is a continuation of Ser. No. 028,447 filed Apr. 9, 1979, abandoned, which is a continuation of Ser. No. 932,421, abandoned, filed Aug. 11, 1978.

BACKGROUND OF THE INVENTION

1. Prior Art

Organosolv hydrolysis processes have been successfully demonstrated on certain types of cellulosic materials particularly lignocellulosics. The easiest wood to delignify by organosolv solutions is aspen while conifers such as hemlock, Douglas-fir and pines showed substantial resistance. Sugarcane rind was found to be relatively easy to hydrolyze. Cotton linters which are essentially cellulose, especially the crystalline fraction, were very difficult to hydrolyze by prior art processes. The reasons for the hydrolysis differences are related to variations and heterogeneity in structure and the chemical composition of cellulosic materials. Thus traditionally organosolv processes have been used primarily with cellulosic materials which are easy to delignify. Cotton linters have been avoided especially in saccharification work because of their resistance to hydrolysis and the harsher process conditions required for their hydrolysis in rapid conversion of the polymeric glucan to monomeric sugars.

The prior art has described various organosolv processes for delignification and/or saccharification of cellulosic materials and vegetable crops. In general such processes involve the use of a mixture of water and a solvent such as alcohols or ketones and sometimes other solvents of a non-polar nature along with an acidic compound to facilitate the hydrolysis. In most instances there is a several hour treatment required to accomplish delignification and additional hydrolysis of the cellulosic residue, depending on the hydrolysis power of the solvent system used and its ability to delignify the particular lignocellulosic material. Prior art processes have been characterized by poor delignification ability, slow hydrolysis rates and extensive sugar conversion into non-sugars, mainly furfurals and organic acids. Hence the sugar recoveries were too low to be commercially attractive to develop such processes on a commercial scale. All of the prior art sacharification processes, of which we are aware of, suffer to some degree from one or the other of these disadvantages. It has long been thought that such were inherent in organosolv processes, particularly with difficult to hydrolyse cellulosic materials such as cotton linters and the conifers.

Thus U.S. Pat. No. 1,919,623 to Dreyfus (1933) describes pretreatment of wood with concentrated acid in acetone-water carrier solvent mixtures and after removal of the organic solvent heating the caid-containing wood at low temperature for several hours to cause in situ hydrolysis of the carbohydrates without simultaneous dissolution of the lignin. The treated lignocellulose was reportedly practically insoluble in the acetone-ether water mixtures, on treatment of the prehydrolysed material with the same solvent only the excess acid was removed and used in further treatments. Decomposition of the pre-hydrolysed cellulose material to sugars was effected on boiling in an aqueous weak acid solution. U.S. Pat. No. 2,022,654 also issued to Dreyfus describes a similar approach for the production of cellulose pulp in that wood chips are pre-treated with concentrated mineral acid carried in up to 80% acetone in water to soften the wood and after substantially removing all the acid the chips are treated for 9 to 12 hours at 170° C. to 230° C. in a pressure vessel using 50 to 80% acetone water or mixtures of acetone and non-polar organic solvent. U.S. Pat. No. 2,959,500 to Schläpfer et al describes a hydrolysis process with the solvent consisting of alcohols and water and optionally of a non-polar solvent at 120° C. to 200° C. in the presence of a small amount of an acidic compound which was claimed by the inventors as unreactive with the alcohols. The process as thought is relatively slow and limited in saccharification power and the sugar yields are much less than quantitative. U.S. Pat. No. 1,964,646 to Oxley et al (1934) shows slow saccharification with strong acid. U.S. Pat. No. 1,856,567 to Kleinert and Tayenthal (1932) teaches the use of aqueous alcohol at elevated temperatures for production of cellulosic pulp in a pressure vessel using small quantities of caids or bases as delignification aids. The treatment is described in steps of three hours each. Other prior art is described in U.S. Pat. No. 2,951,775 to Apel in which wood is saccharified by the use of multiple applications of concentrated hydrochloric acid at 25° C. to 30° C.

2. Objects of Invention

The main object of the present invention is to rapidly and quantitatively solubilize and recover chemical components of cellulosic materials.

A further object of the invention is to reduce the hydrolysis time and substantially increase sugar formation rates in hydrolysing cellulosic materials.

A further object of the invention is to reduce sugar degradation to non-sugars during high temperature hydrolysis of cellulosic materials.

A further object of the invention is to simultaneously dissolve and then recover separately the chemical constituents of cellulosic materials to yeild mainly xylose, hexose sugars and lignin if the material is lignocellulosic.

A further object of of the invention is to, if so desired, convert the isollated pentoses and hexoses into respective dehydration products such as furfural and hydroxymethyl furfural, levulinic acid by re-exposure to high temperature and recover monomeric furfurals, levulinic acid.

A further object of the invention is to quantitatively hydrolyse cellulosic materials at such a rate that, when the organic volatiles are evaporated from the hydrolysis liquor and the lignin if any is separated from the aqueous solution, higher than 10 percent by weight sugar solids is obtainable from the solution.

A further object of the invention is to substantially reduce the concentration of acid required to maintain and regulate a given hydrolysis rate and thereby substantially reduce the catalytic effects of acids in degradation of sugars at high temperature.

Alternately, the object of the present invention is to reduce the reaction temperature required to achieve a certain desirable reaction rate during the hydrolysis process and thereby maximize the sugar recovery.

A further object of the present invention is to reduce the energy required for hydrolysis by use of a major volume proportion or in excess of 70 percent of acetone which has heat capacity and heat of vaporization much lower than that of water and thus can be easily volatilized to cool the hydrolysis liquor.

A further object of the invention is to obtain substantially pure low DP cellulose on very short selective delignification and hydrolysis of cellulosic materials, which is useful as animal fodder, food additive and as industrial filler and adsorbent.

These and other objects will become increasingly apparent by reference to the following description.

GENERAL DESCRIPTION

The present invention relates to an improvement in a process for the production of carbohydrate hydrolysates as sugars from a comminuted cellulosic material which can contain lignin by treating the material in a pressure vessel with a solvent mixture of acetone and water containing a small amount of an acidic compound at elevated temperatures to form reducing sugars in a liquor, the improvement which comprises:

(a) providing mixtures of acetone and water containing at least about 70 volume percent acetone and the catalytic acidic compound as the solvent mixture in the pressure vessel at the elevated temperatures with the cellulosic material;

(b) treating the cellulosic material in the solvent mixture for a limited period of time at the elevated temperatures until the cellulosic material is at least partially dissolved and such that at least 90 percent of the solubilized sugars from the cellulosic material are recovered without degradation to non-sugars in the liquor; and (c) rapidly cooling the liquor as it is removed from the pressure vessel.

The present invention also relates to an improvement in a process for the production of carbohydrate hydrolysates as sugars and lignin from a comminuted cellulosic material which can contain lignin by treating the material in a pressure vessel with a solvent mixture of acetone and water containing a small amount of an acidic compound at elevated temperatures to solubilize any lignin and to form reducing sugars in a liquor, the improvement which comprises:

(a) providing mixtures of acetone and water containing at least about 70 volume percent acetone and the catalytic acidic compound as the solvent mixture in the pressure vessel at the elevated temperatures with the cellulosic material;

(b) treating the cellulosic material in the solvent mixxture for a limited period of time sufficient to dissolve less than 50 percent of the cellulose in one stage at the elevated temperatures until the cellulosic material is at least partially dissolved and such that at least 90 percent of the solubilized sugars from the cellulosic material are recovered without degradation to non-sugars wherein the carbohydrates in the cellulosic material are dissolved and hydrolyzed partially or substantially completely;

(c) continuously removing the liquor from the pressure vessel;

(d) rapidly cooling the liquor by controlled flash evaporation of acetone to retain aqueous solution; and (e) recovering the sugars and any lignins from the residual aqueous solution.

Our application Ser. No. 248,023, filed Mar. 26, 1981, describes a process wherein a ratio of seventy percent (70:30) acetone to water or a lesser amount of acetone is used. The process produced rapid saccharification, but sugars are lost from the saccharification and the saccharification efficiency based upon sugars recovered is reduced.

Unexpectedly, it has been found that acetone in volume concentrations in water of greater than 70% with a catalytic amount of an acid greatly accelerated the hydrolysis rates in forming stable complexes with the sugars form the hydrolysis at elevated saccharification temperatures where there is limited retention time in the pressure vessel. Such phenomenon where decomposition of polymeric carbohydrates is accelerated by sugar complex formation is not described in the prior art and would not be predictable from prior art descriptions. Usually, such complexes have not been believed to exist in aqueous acetone solutions especially at such high temperatures. The result of the present invention is that at the selected conditions there is substantially no degradation of sugars during the saccharification process although the acetone complexes are found to hydrolyse roughly 500 times faster than the alkyl glucosides and polyglucan described in the prior art. Further benefit of the acetone sugar complexes is their facile separation into individual sugar species based on such simple processes as volatilization, selective hydrolysis and liquid-liquid extraction. Complex formation of monomeric sugars in anhydrous acetone in the presence of mineral acids at room temperature is described in Methods in Carbohydrate Chemistry, Vol. II, pp. 318.

The term "cellulose material" includes materials of vegetable and woody origin, generally in comminuted form.

The acidic compounds can be of inorganic or organic origin and should be inert with respect to the solvent. Strong inorganic acids as sulphuric, hydrochloric and phosphoric acids are preferred; acidic salts such as aluminum chloride and sulphate, ferric chloride and organic acids such as trifluoroacetic acid can also be used.

The elevated temperatures are between 145° C. to 230° C., and most preferably between 160° C. to 210° C. The catalytic amount of the acidic compound is preferably between 0.05 to 0.5 percent by weight of the solvent mixture. Smaller amounts are effective especially when higher temperatures are selected. A reaction time per treatment of less than required to dissolve 50 percent of the solid residue at the particular acid concentration and reaction temperature should be used and allows generally acceptably high yield of reducing sugars in dissolved form. The sugar exposure time to high temperature will regulate the rate of solvent feeding to the reactor and will generally depend on the acid concentration, amount of acetone and level of elevated temperature used. Thus for very rapid hydrolysis acid concentrations of 0.04 to 0.06 Normal, acetone concentrations of about 80% and temperatures over 200° C. can be used. However, for near theoretical sugar yields, low acid concentration (0.02 Normal and less) high acetone concentration (above 80 percent) and high temperature (above 200° C.) are most suitable.

The prior art aqueous weak acid and alcoholic organosolv processes are relatively slow and have limited hydrolysis power even with easily hydrolysable lignocellulosic materials such as aspen and sugarcane rind (bagasse). These woods usually take between 60 minutes to 6 hours to become hydrolysed where the sugars hydrolysed in a single step. The lignin is resinified to a dark refractory mass insoluble in alkali and most organic solvents. Shorter hydrolysis times between 30 to 90 minutes are specified for continuous percolation processes, however the sugar yields rarely exceed 45 to 50 percent of the theoretical value by such processing. Higher sugar yields are said to occur with enzymatic hydrolysis processes but these have the draw back that only delignified cellulose can be hydrolyzed by enzymes and the hydrolysis times range between 4 hr for continuous to longer than 24 hr for batch fermentations. On the other hand, difficult to hydrolyze species such as cotton linters and Douglas-fir wood can be easily treated by the present invention and dissolved within 40 and 20 minutes, respectively. The yields of reducing sugars and lignin are in excess of 95 percent of theoretically available amounts and are obtained in high purity and very reactive form by the present invention.

Reaction vessels with inert linings are used to eliminate the sugar degradation catalyzing effects of transition metal ions such as Ni, Co, Cr, Fe and Cu which may be components of metallic vessel walls, tubing and other control elements with which the hot liquor comes into contact with.

Using the process of the invention, continuous percolation at predetermined rates, where there is a residence time of less than that required for hydrolysis of 50 percent of the remaining solid residue at any instance at the prevailing temperature and acid concentration selected in the reaction vessel, is preferred and results in partial or total dissolution of the material depending on the extent the hydrolysis is allowed to proceed. In multiple step batch treatment partial hydrolysis with delignification, which occurs first, yields relatively pure cellulose. Continued hydrolysis with the same or different solvent mixture leads to total saccharification and also allows stepwise separation of the various wood components in high purity and high yield.

Notwithstanding these process options the recovery of pentoses from the reaction mixture is generally by flash evaporation of the major fraction of the acetone first with continued distillation under reduced pressure or by steam stripping to yield the pentose sugar complexes in the distillate. Separation of pentoses and hexoses by such simple means is made possible by the largely differing boiling points of their acetone-sugar complexes which form even in the presence of water during the high temperature hydrolysis step in the present invention provided the acetone concentration exceeds 70% by volume.

The dissolved lignin precipitates in the remaining aqueous sugar solutions as relatively low molecular weight ($MW_w$=3200) granules which can be dried to a powder having spherical particulate sizes between 2 to 300 micrometer on filtration or centrifuging and washing with cold water. Purification of the crude lignin is by repeated re-dissolution in acetone, filtration to remove undissolved residues and re-precipitation into large excess of water or by spray drying the highly concentrated acetone solution. The remaining aqueous solution after filtering off the lignin precipitate is a clear solution of mainly hexose sugars of 10 percent or greater concentration and contains other water soluble compounds.

The pentose distillate and hexose syrup when hydrolyzed by being acidified and boiled for at least 20 minutes yield the major sugar fractions in monosaccharide form and high purity. If so desired, on extended boiling of the separated sugar fractions in the presence of acid, selective conversion of sugars to appropriate dehydration products such as furfurals, levulinic acid and formic acid can be effected, as is known from the prior art.

After hydrolyzing the cellulosic material at elevated temperature for a limited period of time, it is very important that the temperature of the reaction mixture be rapidly lowered to under 100° C. to avoid unwanted degradation of the sugars. This is best accomplished by controlled flashing off of the volatiles since sugar dehydration was found to be insignificant below the boiling point of water even in the presence of dilute acids. Usually, the cooling of the liquor can be continued to ambient temperatures or less (25° C.) before fermentation or further processing.

The above described process can be operated in continuous or semi-continuous manner using batch cooking principles for the latter. Semi-continuous saccharification would employ a battery of pressure vessels each at various stage of hydrolysis to simulate a continuous process. In continuous operation, all stages of hydrolysis are accomplished in a single pressure vessel and the product mix is always determined by the particular saccharification program set. Comminuted wood solids and the cooking liquor are fed continuously to the pressure vessel at such a rate that the time elapsed between feeding and exit of the products would not exceed that determined earlier to obtain 50 percent hydrolysis of solid residue at any one stage considered for the process. Thus the residence time would be always fitted to the most sensitive stage in order to provide sugar recoveries exceeding 90 percent for that particular stage. The three major stages of saccharification to be considered are:

(a) bulk delignification and pre-hydrolysis; during this stage up to 75 percent of the lignin and 95 percent of the governing hemicellulose (xylose in hardwoods and mannose in softwoods) may be removed. The solid residue yield is invariably above 50 percent of the starting material;

(b) continued delignification and cellulose purification stage; during this stage delignification is largely completed and the rest of the hemicellulose sugars and some of the amorphous glucan are removed. The solid residue at this stage is generally less than 35 percent and is predominantly crystalline in nature;

(c) proceeding to total saccharification, the residual cellulose of stage (b) is decomposed to monomeric sugars. This step may take more than one liquor change to accomplish a better than 90 percent sugar recovery.

In continuous operation, liquors collected from the various stages of hydrolysis may contain sugars from all stages (a) to (c) which is the situation with an apparatus having no means of separating the top pre-hydrolysis liquor from the rest of the liquor pumped in with the chips. With the present invention such separation for purification of the sugars is unnecessary because the sugars occur as complexes, pentoses having a different volatility than the hexose sugars with which they may be mixed. The lignin is separated on basis of its insolubility in water and is recovered outside the reactor on flash evaporation of the organic volatiles.

Separation of the first and second stage liquors from the rest of the hydrolyzate would have particular significance on continued heating of the liquors to cause dehydration of especially the pentose sugars to produce corresponding furfurals and levulinic acid. In this case only minor amounts of hexose sugars would have to be saccharified. The sensible way to produce furfural from pentose sugars is following the flash evaporation stage and completion of the first reduced pressure separation of the sugars according to their volatility. Alternately, steam stripping may also be used with good results and relatively pure pentose solutions be obtained in nearly quantitative yields. Such distillates when acidified can be reheated under highly controlled conditions and high purity furfural be produced in better than 95% yields.

In practical hydrolysis, based on the semi-continuous process, five liquor changes would be required to cause total saccharification and dissolution and provide mass recoveries better than 95%. The preferred liquor to wood ratio is 7:1 to 10:1. Due to the shrinking mass bed the total amount of liquor required for hydrolysis of 100 kg of aspen wood at a constant liquor to wood ratio of 7:1 is 1356 kg for an overall liquor to wood ratio of 13.56:1. Under these conditions the average sugar concentration in the combined residual aqueous phase (271 kg) is 30 percent (82.3 kg of recovered sugars).

In continuous percolation, the liquor to wood ratio can be kept constant at 10:1 as by necessity successive additions both wood and liquor will carry hydrolyzates of the residuals already within the reactor. This also establishes sugar concentrations to be in the order of 37 to 40 percent following flash evaporation of the volatiles. Such high sugar solids concentrations were hitherto possible only with strong acid hydrolysis systems but not with dilute acid hydrolysis.

Discussion of the liquor to wood ratio is extremely important in organosolv and acid hydrolysis processes since it directly relates to energy inputs during the hydrolysis and solvent recovery as well as during alcohol recovery from the resulting aqueous solution following fermentation of the sugars to ethanol or other organic solvents. Thus the liquor to wood ratio will have a profound effect on the economics of biomass conversion to liquid chemicals as well as the energy efficiency (energy gained over energy expanded in conversion) of the process.

Steaming of the comminuted cellulosic material before mixing with the hydrolysis liquor can be used to advantage to expel trapped air. Such treatment will aid rapid liquor penetration. Such practice is well known from the prior art.

EXAMPLE I

Saccharification power and sugar survival were compared for three competitive systems namely: acidified water (aqueous weak acid), acidified aqueous ethanol and acidified aqueous acetone in the following example.

In every case purified cotton linters having TAPPI 0.5 percent viscosity of 35 cP and 73 percent crystallinity index at 7 percent moisture content were used. Acidification was affected with sulfuric acid by making up stock solutions of the various solvent systems each being 0.04 Normal with respect to the acid. Hydrolysis conditions were as follows:

In a series of experiments one gram samples of cotton linters (oven dry weight) were placed in glass lined stainless steel vessels of 20 ml capacity along with 10 ml of the solvent mixture and heated at 180° C. for various lengths of time and residual solids and detected sugars in solution were plotted on graph paper. The times to obtain dissolution of about 99, 75, 50 and 25 percent of the substrate were read from the graphs and shown in Table 1. At the end of the reaction periods heating was interrupted, the vessel chilled and its cold contents filtered through medium porosity glass crucible, the undissolved residue first washed with warm water followed by rinsing with several 5 ml portions of acetone and finally by warm water. The residue weight was determined gravimetrically after drying at 105° C.

For comparative analytical purposes the combined filtrates were diluted to 100 ml with water and a half milliliter aliquot was placed in a test tube with 3 ml of 2.0 Normal sulfuric acid added and subjected to a secondary hydrolysis at 100° C. by heating in a boiling water bath for 40 minutes. The solution was neutralized on cooling and the sugars present in the solution were determined by their reducing power. The results were thus uniform based essentially on the resultant monosaccharides liberated during the hydrolysis process. Theoretical percentage of reducing sugars available after the hydrolysis of the substrate was determined by difference between the known chemical composition of the starting material and the weight loss incurred due to the hydrolysis. To account for the weight increase of the carbohydrate fraction due to hydration of the polymer on breakdown into monomeric sugars, the weight loss is normally multiplied by 1.1111, the weight percentage (11.11%) of the added water to the cellulose in hydrolysis to monomeric sugars.

As evidenced from TABLE I, hydrolysis rates improved constantly as the acetone concentration increased to 50 percent. However, significant improvements were observed only as the acetone concentration was raised about 70 percent by volume of the acidified solvent mixture. Very rapid hydrolysis rates were obtained with nearly anhydrous acetone solutions. The dissolved sugars were found to be most stable when using a solvent mixture of between 80 to 90 percent acetone even though the relative half lives were relatively short. Sugar survivals over 90 percent are obtained as long as the reaction time at temperature is kept below that required for hydrolyzing 50 percent of the substrate to dissolved products. The time required to hydrolyze 50 percent of the substrate to dissolved products is called half life of sugar survival. This criteria holds regardless of what stage of hydrolysis is considered. The solvent effect both on the hydrolysis rate and sugar survival for limited hydrolysis times was the most surprising discovery of the present invention whereby maxima were found around 80 to 90 percent acetone concentration in the reaction mixture. At higher acetone concentrations, the response of the hydrolysis rate to increase in temperature and acid concentration was observed to follow well known kinetic principles in contrast to both the aqueous dilute acid and acidified aqueous ethanol systems in which the balance of increase in higher hydrolysis rates and sugar degradation did not improve with an increase in these parameters especially that of the temperature. The improved sugar survival with increase in acetone concentration is attributed to formation of acetone sugar complexes which have improved stability at high temperature. The complexes are very readily and safely hydrolyzable to free sugars on heating with dilute acid at 100° C. for a limited amount of time.

In identical stationary acidified ethanol-water cooks, in which the ethanol concentration was higher than 80 percent neither delignification nor hydrolysis was obtained due to the fact that the acid catalyst was quickly consumed by reaction with the alcohol by formation of ethyl hydrogen sulfate ($C_2H_5$—CO—$SO_2$—OH) and formation of diethyl ether via condensation of two ethanol molecules. Ether formation was quite substantial under these conditions. Also alkyl glucosides formed in high concentration alcohol solutions are substantially more difficult to hydrolyze to free sugars than the corresponding acetone complexes, and alcoholysis results in oligomeric sugars rather than monomers as is the case in acetone-water solutions. Thus alcohols prove to be largely unsuited for hydrolysis media due to the unwanted solvent loss and general danger from the explosive ether. With lignified materials the low delignification power of acidified alcohol solutions is clearly a drawback. With 80:20 ethanol:water cooks in the presence of 0.190 percent (0.04 Normal) sulfuric acid at 180° C. the hydrolysis rate was $5.47\times10^3$ $min^{-1}$ and the half life of cotton linters decomposition was 126.8 minutes. A maximum of 76 percent could be dissolved in 254 minutes, the crystalline residue showing substantial resistance to hydrolysis in the alcoholic solvent. Residual acid concentration was found to be one fourth of that originally applied, i.e., 0.01 Normal, the balance possibly consumed in the various side reactions.

It is evident from the data that under identical hydrolysis conditions excessively long hydrolysis times are required for complete dissolution of cotton linters both by acidified water and acidified aqueous ethanol media. An increase of the ethanol concentration from 50 percent to 80 percent did not improve the hydrolysis rate or improve particularly the sugar survival. The hydrolysis rate in ethanol water was only marginally better than in dilute acid in water.

These examples clearly show that a high acetone concentration over 70 percent is mandatory for high speed hydrolysis and high sugar survival. Under the conditions indicated for sugar recoveries better than 90 percent, reactions times (or high temperature exposure times of less than indicated for half lives are preferred). Thus according to these data, total saccharification and quantitative sugar recovery would dictate a percolation or pass through process wherein the liquor residence time would not exceed 10 minutes when 80:20 acetone:water with 0.04 Normal sulfuric acid is used as solvent mixture at 180° C. temperature. The residence time would have to be substantially shortened when higher temperatures and larger acid concentrations are used as shown in the following examples.

Solid residues less than 50% in yield show high degree of crystallinity (87%) and are pure white, have a DP (degree of polymerization) of 130 to 350.

TABLE 1

FORWARD REACTION RATES IN STATIONARY HYDROLYSIS OF COTTON LINTERS AS A FUNCTION OF ACETONE CONCENTRATION.
Catalyst: 0.04 N $H_2SO_4$; Temp. 180° C, Liquor/wood = 10/1.

| ACETONE/ WATER RATIO | DISSOLVED CELLULOSE % | REACTION TIME min | $R_x$ RATE $10^3$ $min^{-1}$ | FACTOR | REDUCING SUGAR YIELD, % | |
|---|---|---|---|---|---|---|
| ∅, $H_2O$ | 25 | 137 | 2.1 | 1 | 82 | |
| | 50 | 330 | | | 46 | |
| | 75 | 660 | | | 16 | |
| | 99 | 2192 | | | — | |
| 10/90 | 25 | 115 | 2.5 | 1.2 | — | Too slow hydrolysis |
| | 50 | 277 | | | — | rate and generally |
| | 75 | 555 | | | — | poor sugar |
| | 99 | 1842 | | | — | recoveries |
| 30/70 | 25 | 91 | 3.16 | 1.5 | — | |
| | 50 | 219 | | | — | |
| | 75 | 439 | | | — | |
| | 99 | 1458 | | | — | |
| 50/50 | 25 | 49 | 5.89 | 2.8 | 95 | Exc. Recov. |
| | 50 | 118 | | | 64 | Good Recov. |
| | 75 | 235 | | | 36 | Poor |
| | 99 | 783 | | | 27 | Recovery |
| 70/30 | 25 | 12 | 24.1 | 11.5 | 98 | Exc. Recov. |
| | 50 | 29 | | | 73 | Good Recov. |
| | 75 | 58 | | | 45 | Poor |
| | 99 | 191 | | | 35 | Recovery |
| 80/20 | 25 | 5 | 52.7 | 25.1 | 99 | Excellent |
| | 50 | 13 | | | 96 | Recovery |
| | 75 | 26 | | | 73 | Good Recov. |
| | 99 | 87 | | | 58 | Poor Recov. |
| 90/10 | 25 | 3 | 112.8 | 53.7 | 99 | Excellent |
| | 50 | 6 | | | 94 | Recovery |
| | 75 | 12 | | | 79 | Good Recov. |
| | 99 | 41 | | | 56 | Poor Recov. |

EXAMPLE II

The effect of acid concentration on the rate of hydrolysis and sugar survival in 80:20 acetone:water solvent mixtures was studied at 180° C. temperature using cotton linters as substrate.

In stationary cooks one gram samples (oven dry) of cotton liners were hydrolyzed in glass lined stainless steel pressure vessels along with 10 ml of the appropriate hydrolysis liquor and heated until the original substrate mass was hydrolyzed and dissolved. The levels of 25, 50, 75 and 99 percent of hydrolysis were determined by graphing as in Example I.

Work-up of the reaction products followed the same procedure as outlined in Example I. The results are indicated in TABLE 2.

Increased acid concentration resulted in higher hydrolysis rates within the range studied and a somewhat faster degradation of the sugars as the single stage hydrolysis times exceeded those indicated as half lives for the solid residue. Equal concentrations of sulfuric and hydrochloric acid were found to give largely comparable results. The increased acid concentrations showed a substantial hydrolysis accelerating effect as evidenced by the rapidly decreasing half lives. Thus the hydrolysis rate can be readily controlled by limited acid concentrations, all other conditions being held constant.

The data indicate that increased temperature had the most profound accelerating effect of the hydrolysis rate and generally in such single stage batch cooks reaction times exceeding sugar dissolution half lives at any stage of the hydrolysis increased somewhat the rate of sugar degradation at the higher temperature regimes used. However, it was learned that such high temperature hydrolyses afford practically instantaneous high-yield hydrolysis to be carried out on even such difficult to hydrolyze substrate as cotton linters. The rate of sugar degradation can be offset somewhat by lowering the acid concentration and by increasing the liquor to wood ratio whereby the forward reaction rate ($k_1$) in hydrolysis remains unaffected but the sugar degradation rate ($k_2$) is lowered. Thereby sugar survival, which depends on the ratio of $k_1/k_2$ is largely improved especially if high acetone concentrations are used.

TABLE 2

EFFECT OF ACID CONCENTRATION ON FORWARD HYDROLYSIS RATES IN STATIONARY HYDROLYSIS OF COTTON LINTERS.
Temp.: 180° C., Solvent: Acetone/Water = 80/20, L/W-10/1.

| ACID CONC. NORMAL | $H_2SO_4$ % | DISSOLVED CELLULOSE % | REACTION TIME min | $R_x$ RATE $10^3$ $min^{-1}$ | FACTOR | REDUCING SUGARS % |
|---|---|---|---|---|---|---|
| 0.01 | 0.047 | 25 | 32.3 | 8.9 | 1 | 99 |
| | | 50 | 77.9 | | | 90 |
| | | 75 | 155.8 | | | 67 |
| | | 99 | 517.0 | | | 57 |
| 0.02 | 0.095 | 25 | 12.2 | 23.6 | 2.65 | 99 |
| | | 50 | 29.4 | | | 95 |
| | | 75 | 58.8 | | | 71 |
| | | 99 | 195.0 | | | 67 |
| 0.04 | 0.190 | 25 | 5.0 | 52.7 | 5.92 | 99 |
| | | 50 | 13.0 | | | 96 |
| | | 75 | 26.0 | | | 73 |
| | | 99 | 87.7 | | | 58 |
| 0.06 | 0.285 | 25 | 3.5 | 82.0 | 9.2 | 99 |
| | | 50 | 8.5 | | | 87 |
| | | 75 | 17.0 | | | 63 |
| | | 99 | 56.2 | | | 52 |
| 0.10 | 0.475 | 25 | 2.3 | 123.8 | 13.9 | 99 |
| | | 50 | 5.6 | | | 88 |
| | | 75 | 11.2 | | | 60 |
| | | 99 | 37.3 | | | 50 |
| 0.02 | 0.07 | 25 | 12.8 | 21.7 | 2.44 | 98 |
| HCl | | 50 | 30.1 | | | 92 |
| | | 75 | 61.2 | | | 69 |
| | | 99 | 204.3 | | | 60 |

EXAMPLE III

Temperature effects on hydrolysis of cotton linters were studied with acidified aqueous acetone solutions containing 0.04 Normal sulfuric acid in 80:20 acetone:-water at different hydrolysis times so that weight losses of 25, 50, 75 and 99 percent could be determined as in Example I. All cooks were preconditioned to 35° C. before being placed in the oil bath to minimize the effect of heating-up time at the various temperature levels studied.

Work-up of the products and analysis followed the same procedure as described in EXAMPLE I and the results are summarized in TABLE 3.

TABLE 3

EFFECT OF TEMPERATURE ON HYDROLYSIS RATE OF COTTON LINTERS AND SURVIVAL OF SUGARS IN ACIDIFIED 80:20 ACETONE WATER.
Catalyst: 0.04 Normal $H_2SO_4$,L/W = 10/1.

| REACTION TEMP. °C. | DISSOLVED CELLULOSE % | REACTION TIME min | $R_x$ RATE $10^3$ $min^{-1}$ | FACTOR** | REDUCING SUGARS % |
|---|---|---|---|---|---|
| 145* | 25 | 40 | 7.2 | 3.42 | 78 |
| | 50 | 96 | | | 65 |
| | 75 | 193 | | | 53 |
| | 99 | 640 | | | 40 |
| 160 | 25 | 19 | 21.6 | 10.3 | 91 |
| | 50 | 49 | | | 64 |
| | 75 | 98 | | | 48 |
| | 99 | 329 | | | 37 |
| 180 | 25 | 5 | 52.7 | 25.1 | 99 |
| | 50 | 13 | | | 96 |
| | 75 | 26 | | | 73 |
| | 99 | 87.7 | | | 58 |
| 200 | 25 | 1.0 | 301 | 143 | 99 |
| | 50 | 2.3 | | | 98 |
| | 75 | 4.6 | | | 78 |
| | 99 | 15.2 | | | 63 |
| 210 | 25 | 0.39 | 745 | 354 | 99 |

TABLE 3-continued

EFFECT OF TEMPERATURE ON HYDROLYSIS RATE OF COTTON LINTERS AND SURVIVAL OF SUGARS IN ACIDIFIED 80:20 ACETONE WATER.
Catalyst: 0.04 Normal $H_2SO_4$,L/W = 10/1.

| REACTION TEMP. °C. | DISSOLVED CELLULOSE % | REACTION TIME min | $R_x$ RATE $10^3$ $min^{-1}$ | FACTOR** | REDUCING SUGARS % |
|---|---|---|---|---|---|
| | 50 | 0.93 | | | 92 |
| | 75 | 1.86 | | | 80 |
| | 99 | 6.17 | | | 58 |

*Acetone/water = 90:10, 0.10 Normal $H_2SO_4$
**$k_{water}$ = 1.0 ($k_1$ = 2.1; Table 1)

EXAMPLE IV

Cooks reported in this example explore the hitherto unobserved relationship of increasing the sugar survival at reduced acid concentration and increased reaction temperatures without any reduction in the high hydrolysis rates disclosed herein. This unusual discovery is demonstrated in the data of TABLE 4.

The effect of reduced acid concentration but high reaction temperature is demonstrated by cooking one gram samples of cotton linters (oven-dry weight) in glass lined stainless steel pressure vessels along with 10 ml of 80:20 acetone:water cooking liquor containing 0.01 and 0.005 Normal $H_2SO_4$ with respect to the solvent mixture, and heated until 50 percent and 75 percent dissolution of the substrate was obtained at 190° to 220° C. reaction temperature.

Cooling and work-up of the reaction products to determine sugar survival and reaction rates were performed as outlined in EXAMPLE I.

The data indicate that acid concentration can be successfully reduced and traded by increasing the reaction temperature without loss in reaction rate with a concomittant increase in sugar yield (survival) when hydrolysis liquors of at least 80 percent acetone content are used. Such a trend is clearly against all previously published scientific results (Seamen, J. F., ACS, Honolulu 1979; Bio-Energy, Atlanta 1980) where the increase in hydrolysis rates and sugar survival was a function of both increased acid concentration and higher temperature. The surprising solvent effect of the acetone water system has never been observed or reported in scientific literature or the prior art before.

TABLE 4

EFFECT OF HIGH REACTION TEMPERATURE AND VERY LOW ACID CATALYST CONCENTRATION ON SURVIVAL OF SUGARS ON HYDROLYSIS OF COTTON LINTERS IN 80:20 ACETONE WATER SOLVENT.
L/W = 10/1.

| REACTION TEMP. °C. | DISSOLVED CELLULOSE % | REACTION TIME min | $R_x$ RATE $10^3$ $min^{-1}$ | REDUCING SUGARS % |
|---|---|---|---|---|
| | | 0.01 | Normal[$H_2SO_4$] 490 ppm | |
| 180 | 50 | 48.1 | 14.4 | 87.7 |
| | 75 | 96.3 | | 64.8 |
| 190 | 50 | 18.8 | 36.8 | 90.4 |
| | 75 | 87.7 | | 70.5 |
| 200 | 50 | 7.4 | 94.2 | 91.5 |
| | 75 | 14.8 | | 73.2 |
| 210 | 50 | 2.0 | 241.4 | 91.5 |
| | 75 | 5.7 | | 75.7 |
| | | 0.005 | Normal [$H_2SO_4$] 245 ppm | |
| 190 | 50 | 45.3 | 15.3 | 92.0 |
| | 75 | 90.6 | | 73.3 |
| 200 | 50 | 17.7 | 39.2 | 93.0 |
| | 75 | 35.5 | | 74.4 |

TABLE 4-continued

EFFECT OF HIGH REACTION TEMPERATURE AND VERY LOW ACID CATALYST CONCENTRATION ON SURVIVAL OF SUGARS ON HYDROLYSIS OF COTTON LINTERS IN 80:20 ACETONE WATER SOLVENT.
L/W = 10/1.

| REACTION TEMP. °C. | DISSOLVED CELLULOSE % | REACTION TIME min | $R_x$ RATE $10^3$ $min^{-1}$ | REDUCING SUGARS % |
|---|---|---|---|---|
| 210 | 50 | 6.9 | 100.4 | 94.0 |
| | 75 | 13.8 | | 78.4 |
| 220 | 50 | 2.7 | 257.8 | 96.3 |
| | 75 | 5.4 | | 81.0 |
| 230 | 50 | 0.25 | 659.9 | 98.0 |
| | 75 | 0.36 | | 87.5 |

EXAMPLE V

One gram samples of several wood species were hydrolyzed in 80:20 acetone:water containing 0.04 Normal sulfuric acid at 180° C. Hydrolysis rates were calculated only for the crystalline cellulose fractions to avoid the confounding effect of easily hydrolyzable lignin and hemicelluloses. Times to mass losses of 25, 50, 75 and 99 percent of the original oven dry mass along with the calculated reaction rates are recorded in TABLE 4.

Work-up of the products followed the same procedure as indicated in EXAMPLE I except that after removal of the volatiles by distillation it was necessary to remove the precipitated lignins by filtration or centrifuging.

It is quite evident that under identical conditions the hydrolysis rates for wood are roughly twice that of cotton liners. Due to the increased forward reaction rates sugar recoveries became quite impressive indeed.

The rate of Douglas-fir hydrolysis was somewhat slower than that of aspen and sugarcane rind. However, when hydrolysis in a purely aqueous system was attempted under otherwise exactly matching conditions (same temperature and acid catalyst content) a hydrolysis rate of $0.5 \times 10^3$ $min^{-1}$ was obtained and only 6 percent weight loss was recorded for a 280 min long cook at 180° C. the usual dilute acid hydrolysis temperature. Thus the high acetone content hydrolysis liquor allowed at least 100 times faster hydrolysis of Douglas fir by simultaneous dissolution of the lignin than possible in purely aqueous systems.

Among the products of partial saccharification of wood, solid residues of about 30 to 35% yield are pure white, devoid of residual lignin. This cellulosic fraction has a crystallinity index of 80% from aspen wood and a degree of polymerization (DP) of between 80 to 280. Similar results are obtained with the other wood species.

TABLE 5

HYDROLYSIS RATES OF SELECTED WOOD SPECIES IN 80:20 ACETONE:WATER MIXTURES AT 180° C. IN THE PRESENCE OF 0.04 NORMAL SULPHURIC ACID AS CATALYST. (Liquor/Wood = 10/1)

| WOOD SPECIES | DISSOLVED CELLULOSE, % | REACTION TIME,min | $R_x$ RATE $10^3 min^{-1}$ | FACTOR | REDUCING SUGARS, % |
|---|---|---|---|---|---|
| ASPEN | 25 | 2.1 | 135.2 | — | 99 |
| | 50 | 5.0 | | | 98 |
| | 75 | 10.3 | | | 96 |
| | 99 | 34.5 | | | 92 |
| SUGARCANE RIND | 25 | 2.2 | 134 | — | 99 |
| | 50 | 5.0 | | | 98 |
| | 75 | 10.4 | | | 96 |
| | 99 | 34.5 | | | 92 |
| DOUGLAS-FIR | 25 | 3.0 | 98 | — | 99 |
| | 50 | 7.0 | | | 97 |
| | 75 | 14.0 | | | 92 |
| | 99 | 46.1 | | | 86 |

EXAMPLE VI

It is found to be a further advantage of the present invention that the high acetone concentration clearly favors formation of relatively stable acetone-sugar complexes in spite of the presence of water. The better stability of the sugar complexes at high temperature profoundly affects survival of the dissolved sugars. The improvements are quite evident from the data in TABLE 1.

Further due to the differences in volatility and solubility of the various sugar complexes the invention allows facile segregation and nearly quantitative isolation of the five major wood sugars, if so desired. However, due to the mixed nature of the sugar derivatives in aqueous hydrolyzates, if such thorough and detailed separation is desired, it is always necessary to neutralize the recovered aqueous sugar wort after removal of the volatiles and concentrate the wort to a syrup. The syrup is then redissolved in anhydrous acetone containing 3 percent acid, allowed to stand at least 6 hr until all sugars formed their respective di-acetone complexes before attempting the detailed separation as described below. The separated sugar complexes are readily hydrolyzed in dilute acid on boiling at least 20 to 40 minutes.

Thus 10 g (OD) coarse aspen wood sawdust (passing a 5 mesh screen) was charged with 100 ml of hydrolyzing liquor made up to 80:20 acetone-water and 0.04 Normal sulfuric acid as catalyst. The bomb was brought to 180° C. temperature by immersing it into a hot glycerol bath within 9 min and heating was continued until the required reaction times were reached.

In another larger bomb 450 ml of hydrolysis liquor containing 80:20 acetone:water and 0.04 Normal sulfuric acid was also preheated and connected through a syphon tube and shut-off valve to the reaction vessel. Following three minutes at reaction temperature (9+3=12 min total) the reaction liquor was drained into a small beaker containing 75 g crushed ice. The reaction vessel was immediately recharged with hot liquor from the stand-by vessel and the reaction was allowed to proceed for an additional 3 minutes before again discharging the reactor contents as above. In all, five liquor changes were effected and the liquors collected for analysis. The chilled reactor contents were analyzed as follows:

Hydrolysate No. 1 and 2 were combined before evaporation of the low boiling volatiles. Flash evaporation of the acetone at low temperature (50° C.) and reduced pressure resulted in precipitation of a flocculant lignin which aggregated to small clusters of granules on standing. The lignin was carefully filtered off the mother liquor, washed with two portions of water and dried in vacuo to constant weight as a powder. The lignin powder collected weighed 1.67 g and had a weight average molecular weight of 2800.

The combined filtrate (127 ml) was neutralized and subjected to steam distillation in an all glass apparatus and approximately 35 ml distillate was collected. Both the distillate and residual solution were made up to 100 ml and 0.5 ml portions of each were acidified with sulfuric acid to 3 percent acid and boiled for 40 min on a water bath. The solutions were neutralized and the sugar reducing power determined by the Somogyi method. The yield of sugars was 1.89 g in the distillate and 1.96 g from the residual liquor.

Gas chromatographic determination of alditol acetates of the sugars from the steam distillate indicated mainly xylose and arabinose whereas from the residual solution glucose, mannose and galactose with only minor traces of xylose were indicated.

Hydrolysate No. 3 contained only traces of lignin after evaporation of the acetone solvent too small to collect and determine gravimetrically. It was removed by centrifuging. The aqueous residue (97 ml) was acidified to 3 percent acid with sulfuric acid, boiled for 40 min and after neutralization filtered and made up to 100 ml. The reducing agent content of the filtrate was determined by the Somogyi method to be 1.83 g. GC analysis of the alditol acetates determined on an aliquot sample indicated mainly glucose with traces of mannose and galactose.

Hydrolysate No. 4 and 5 were processed and analyzed in the same manner as No. 3. H-4 yielded 1.73 g reducing sugars and H-5 yielded 1.40 g sugars both being composed only of glucose as evidenced by GC analysis of an aliquot sample.

The undissolved residue was 0.12 g following 2 h drying in an oven at 105° C.

The recoveries summarize as follows:

| | |
|---|---|
| Lignin powder | 1.67 g |
| Total pentose sugars | 1.89 g |
| Total hexose sugars | 6.92 g |
| Undissolved residue (99% glucose) | 0.12 g |
| | 10.60 g |
| MASS BALANCE: | |
| 1. LIGNIN RECOVERY: | 98.2% |

-continued

| | |
|---|---|
| 2. SUGAR RECOVERY: | 97.8% |

EXAMPLE VII

In a similar hydrolysis arrangement to EXAMPLE VI 10 g OD Douglas-fir sawdust (to pass a 10 mesh screen), pre-extracted with dichloromethane and air dried to 8 percent moisture content in a controlled humidity room, was hydrolyzed with 80:20 acetone:water solvent containing 0.05 Normal hydrochloric acid in five consecutive steps. Each reaction step consisted of three minutes at a reaction temperature of 200° C. The heating up time was 7 minutes. Again Hydrolysate No. 1 and 2 were combined whereas the subsequent fractions were analyzed separately.

The combined liquor of H-1 and H-2 yielded 2.39 g lignin on low temperature evaporation of the volatiles and 135 ml of aqueous liquor was collected on filtration of the powdered lignin. The dried lignin had a weight average molecular weight of 3200. The filtrate was neutralized to pH 8 and subjected to steam distillation in an all glass apparatus. The 28 ml distillate which was collected contained 0.62 g pentoses which after passing the filtrate through a cation exchange resin in the acid form and repeated steam distillation of the filtrate yielded 0.58 g xylose as determined by GC analysis.

The residue remaining behind after the above steam distillation (128 ml) was neutralized on an ion exchange column, the filtrate concentrated to a syrup, seeded with some crystalline mannose and left standing overnight. The crystalline material was collected by filtration and recrystallization from ethanol-petroleum ether. The crystals were re-dissolved in water, acidified to 3 percent acid and boiled for 40 min to liberate the free sugars. After neutralization with silver carbonate the solution was analyzed by GC alditol acetates to determine the sugar concentration. The only sugar detected by GC was mannose and the yield was calculated as 1.00 g.

The ethanol-petroleum ether solution was extracted with 5 ml portions of water and the collected aqueous layer combined with the syrup removed from the crystalline product above. The solution was briefly heated to expel the alcohol, made up to 3 percent acid with hydrochloric acid, boiled for 40 min, neutralized with silver carbonate and alditol acetates were prepared for GC analysis. The combined syrup and filtrate contained a total of 58 g sugars of which 0.29 g was galactose, 0.25 g was glucose and 0.04 g was mannose.

Hydrolysate No. 3 gave 1.89 pure glucose with 0.4 g of lignin precipitate on removal of the volatiles.

Hydrolysate No. 4 gave 1.66 g of pure glucose with only very small traces of lignin, whereas H-5 gave 1.85 g of glucose and no lignin. The undissolved residue was 0.18 g and was composed of 99 percent glucose.

The recoveries summarize as follows:

| | | |
|---|---|---|
| H-1, 2 & 3: | Lignin | 2.79 g |
| | Xylose | 0.58 g |
| | Arabinose (by difference) | 0.04 g |
| | Mannose | 1.00 g |
| | Hexoses | 0.58 g |
| H-3: | Hexoses | 1.89 g |
| H-4: | Hexoses | 1.66 g |
| H-5: | Hexoses | 1.85 g |
| | Unhydrolyzed residue | 0.18 g |

-continued

| |
|---|
| 10.57 g |

TOTAL SUGAR RECOVERY: 7.60 g = 95.95% (of theoretical)
LIGNIN RECOVERY: 98%

Under large scale industrial conditions chilling of the recovered sugar solutions is best accomplished by controlled flash evaporation of the volatiles. Cooling of the liquor samples outside of the pressure vessel in EXAMPLES VI and VII with crushed ice was adapted as matter of convenience for small scale treatments.

We claim:

1. In a process for the production of carbohydrate hydrolysates as sugars from a comminuted cellulosic material which can contain lignin by treating the material in a pressure vessel with a solvent mixture of acetone and water containing a small amount of an acidic compound at elevated temperatures to form reducing sugars in a liquor, the improvement which comprises:

(a) providing mixtures of acetone and water containing greater than 70 volume percent acetone and the catalytic acidic compound as the solvent mixture in the pressure vessel at the elevated temperatures with the cellulosic material;

(b) repeatedly treating the cellulosic material in the solvent mixture for a limited period of time at the elevated temperatures until the cellulosic material is at least partially dissolved and such that at least 90 percent of the solubilized sugars from the cellulosic material are recovered without degradation to non-sugars in the liquor; and (c) rapidly cooling the liquor as it is removed from the pressure vessel after each treatment, wherein the cellulosic material is treated on a batch or continuous basis in the pressure vessel using successive amounts of the solvent mixture thereby defining successive stages of treatment at the elevated temperatures, wherein less than 50 percent by weight of the cellulosic material is dissolved in each stage of treatment and wherein in each stage the cellulosic material is treated for a limited period of time in the pressure vessel and then the withdrawn liquor is rapidly cooled when removed from the pressure vessel so as to achieve the sugar recovery.

2. The process of claim 1 wherein the concentration of acetone in the acetone and water mixture is between 80 to 90 volume percent.

3. The process of claim 2 wherein the acidic compound is sulfuric acidic and the concentration is less than 2 percent per weight of the acetone-water mixture.

4. The process of claim 3 wherein the acidic compound is hydrochloric acid and the concentration is less than 1 percent per weight of the acetone-water mixture.

5. The process of claim 1 wherein the elevated temperatures are between 145° C. to 230° C.

6. The process of claim 1 wherein the addition the liquor is further hydrolyzed at elevated temperatures and dilute acid solutions to produce essentially monomeric sugars.

7. The process of claim 1 wherein the liquor is subjected to distillation whereby pentoses are volatilized from the liquor.

8. The process of claims 1, 6 or 7 wherein the aqueous solution contains dissolved sugars in excess of 15 percent solids.

9. The process of claim 3 or 4 wherein the concentration of the acid is between 0.10 Normal and 0.001 Normal with respect to the acetone-water mixture.

10. The process of claim 1 wherein the volatiles in the liquor are distilled at reduced pressures to leave an aqueous solution in which lignin is precipitated and is separated.

11. In a process for the production of carbohydrate hydrolysates as sugars and lignin from comminuted cellulosic material which can contain lignin by treating the material in a pressure vessel with a solvent mixture of acetone and water containing a small amount of an acidic compound at elevated temperatures to solubilize any lignin and to form reducing sugars in a liquor, the improvement which comprises:

(a) providing mixtures of acetone and water containing greater than 70 volume percent acetone and the catalytic acid compound as the solvent mixture in the pressure vessel at the elevated temperatures with the cellulosic material;

(b) repeatedly treating the cellulosic material in the solvent mixture for limited periods of time at the elevated temperatures until the cellulosic material is at least partially dissolved and such that at least 90 percent of the solubilized sugars from the cellulosic material are recovered without degradation to non-sugars wherein the carbohydrates in the cellulosic material are dissolved and hydrolyzed partially or substantially completely;

(c) continuously removing the liquor from the pressure vessel;

(d) rapidly cooling the liquor by controlled flash evaporation of acetone to form a residual aqueous solution after each treatment, wherein the cellulosic material is treated in the pressure vessel using successive amounts of the solvent mixture thereby defining successive stages of treatment at the elevated temperatures, wherein less than 50 percent of the cellulosic material is dissolved in each stage and wherein in each stage the cellulosic material is treated for a limited period of time in the pressure vessel and then the withdrawn liquor is rapidly cooled when removed from the pressure vessel so as to achieve the sugar recovery.

12. The process of claim 11 wherein the cellulosic material is lignocellulosic and wherein the volatiles in the liquor are distilled at reduced pressure to leave the residual aqueous solution and precipitated lignin and wherein the residual aqueous solution is neutralized prior to recovering the sugars.

13. The process of claim 11 wherein the concentration of acetone and water is between 80 to 90 percent.

14. The process of claim 11 wherein the pentose sugars are volatilized from the residual aqueous solution as acetone complexes to separate them from the hexose sugars.

15. The process of claim 14 wherein the sugar-acetone complexes are each broken by contacting the complexes with aqueous acid at elevated temperature.

16. The process of claim 15 wherein the complexes are continuously treated with aqueous acid at elevated temperature until sugar dehydration products are formed.

17. The method of claim 11 wherein the cellulosic material is treated in a batch or continuous manner and the recovered solvent fractions are worked up separately or in unison.

18. The method of claim 11 wherein hydrolysis of the cellulosic material is stopped at a point where essentially pure crystalline cellulose is recovered as solid residue from the reactor.

* * * * *

UNITED STATES PATENT AND TRADEMARK OFFICE

CERTIFICATE OF CORRECTION

PATENT NO. : 4,470,851

DATED : 1984 September 11

INVENTOR(S) : Laszlo Paszner and Pei-Ching Chang

It is certified that error appears in the above-identified patent and that said Letters Patent are hereby corrected as shown below:

Column 1, line 54, after "aware", delete "of".

Column 2, line 44, "yeild" should be --yield--.

Column 2, line 47, "of" (second occurrence) should be deleted.

Column 2, line 48, "isollated" should be --isolated--.

Column 3, line 51, "mixxture" should be --mixture--.

Column 4, line 10, "form" should be --from--.

Column 5, line 50, "solutions" should be --solution--.

Column 6, line 8, "dehydration" should be --degradation--.

Column 8, line 66, "$C_2H_5$-CO-$SO_2$-OH" should be --$C_2H_5$-O-$SO_2$-OH--.

Column 10, line 3, the hyphen "-" should be deleted at the end of the line.

Column 11, line 37, the hyphen "-" should be deleted at the end of the line.

Column 15, line 47, "acetone-water" should be --acetone:water--.

UNITED STATES PATENT AND TRADEMARK OFFICE
CERTIFICATE OF CORRECTION

PATENT NO. : 4,470,851

DATED : 1984 September 11

INVENTOR(S) : Laszlo Paszner and Pei-Ching Chang

It is certified that error appears in the above-identified patent and that said Letters Patent are hereby corrected as shown below:

Column 16, line 48, "agent" should be --sugar--.

Column 17, line 34, "recrystallization" should be --recrystallized--.

Column 17, line 53, "1.89" should be --1.89g--.

Column 18, line 59, "the" (second occurrence) should be --in--.

Column 19, line 2, "0.001" should be --0.0001--.

Column 20, line 11, "pressure" should be --pressured--.

Signed and Sealed this

*Ninth* Day of *April 1985*

[SEAL]

*Attest:*

DONALD J. QUIGG

*Attesting Officer* *Acting Commissioner of Patents and Trademarks*